(12) United States Patent
Ficara et al.

(10) Patent No.: US 9,363,275 B2
(45) Date of Patent: Jun. 7, 2016

(54) SAMPLED DETERMINISTIC FINITE AUTOMATA FOR DEEP PACKET INSPECTION

(71) Applicant: CISCO TECHNOLOGY, INC., San Jose, CA (US)

(72) Inventors: Domenico Ficara, Rolle (CH); Salvatore Valenza, Pomy (CH); Roberto Muccifora, Ropraz (CH); Leo Caldarola, Saint-Prex (CH)

(73) Assignee: Cisco Technology, Inc., San Jose, CA (US)

( * ) Notice: Subject to any disclaimer, the term of this patent is extended or adjusted under 35 U.S.C. 154(b) by 231 days.

(21) Appl. No.: 14/109,590

(22) Filed: Dec. 17, 2013

(65) Prior Publication Data

US 2015/0172159 A1      Jun. 18, 2015

(51) Int. Cl.
*G06F 17/00* (2006.01)
*G06N 5/02* (2006.01)
*H04L 29/06* (2006.01)
*G06F 9/44* (2006.01)

(52) U.S. Cl.
CPC ............ *H04L 63/1408* (2013.01); *G06F 9/444* (2013.01)

(58) Field of Classification Search
None
See application file for complete search history.

(56) References Cited

U.S. PATENT DOCUMENTS

| 2004/0179477 | A1* | 9/2004 | Lincoln | H04L 12/2602 370/241 |
| --- | --- | --- | --- | --- |
| 2008/0034427 | A1 | 2/2008 | Cadambi et al. | |
| 2009/0274247 | A1* | 11/2009 | Galbraith | G11B 20/10009 375/341 |
| 2014/0122408 | A1* | 5/2014 | Li | G06N 5/022 706/50 |

OTHER PUBLICATIONS

Ficara D.,Antichi G., Di Pietro A.,Giordano S.,Procissi G.,Vitucci F.,"Sampling Techniques to Accelerate Pattern Matching in Network Intrusion Detection Systems",IEEE(ICC2010).
Ficara D.,Antichi G.,Bonelli N.,Di Pietro A.,Giordano S.,Procissi G.,Vitucci F.,"Scaling Regular Expression Matchin Performance in Parallel Systems through Sampling",IEEE2011.
M. Becchi and P. Crowley, "Efficient regular expression evaluation: theory to practice," in ANCS '08, 2008.
S.Kumar,S.Dharmapurikar,F.Yu,P.Crowley,J.Turner"Algorithms to accelerate multiple regular expressions matching for deep packet inspection" SIGCOMM '06,pp. 339-350.
S.Kong,R.Smith,C.Estan"Efficient Signature Matching with Multiple Alphabet Compression Tables"SecureComm, Sep. 2008.

(Continued)

*Primary Examiner* — Li-Wu Chang
(74) *Attorney, Agent, or Firm* — Cindy Kaplan

(57) ABSTRACT

In one embodiment, a method includes sampling text in a received packet at a network device and analyzing the sampled text using a sampled deterministic finite automata (DFA) to identify matches between a set of regular expressions and the text. The sampled DFA is created with the regular expressions sampled at a sampling rate calculated for the regular expressions using operations including selecting a minimum sampling rate from sampling rates computed for each of the regular expressions based on a minimum length of the text that can match the regular expression. An apparatus and logic are also disclosed herein.

18 Claims, 6 Drawing Sheets

(56) References Cited

OTHER PUBLICATIONS

D.Ficara,S.Giordano,G.Procissi,F.Vitucci,G.Antichi,A.DiPeitro"An improved dfa for fast regular expression matching"SIGCOMM 38(5), 2008.

R.Sommer,V.Paxson"Enhancing byte-level network intrusion detection signatures with context" in Proc. of CCCS '03, pp. 262-271.

M.Becchi,P.Crowley"An improved algorithm to accelerate regular expression evaluation" In Proc. of ANCS '07, pp. 145-154, 2007.

R.Smith,C.Estan,S.Jha"Xfa: Faster signature matching with extended automata" In IEEE Symposium on Security and Privacy, May 2008.

S.Kumar,B.Chandrasekaran,J.Turner,G.Varghese"Curing regular expressions matching algorithms from insomnia, amnesia, and acalculia" In Proc. of ANCS '07, pp. 155-164. ACM.

N.Tuck,T.Sherwood,B.Calder,G.Varghese"Deterministic memory-efficient string matching algorithms for intrusion detection" In Proc. of INFOCOM 2004, pp. 333-340.

M.Becchi,P.Crowley"A Hybrid Finite Automation for Pratical Deep Packet Inspection" In Proc. of CoNEXT 2007.

Becchi M,Cadambi,S"Memory-Efficient Regular Expression Search Using State Merging" In INFOCOM 2007.

\* cited by examiner

SAMPLED DETERMINISTIC FINITE AUTOMATA FOR DEEP PACKET INSPECTION

TECHNICAL FIELD

The present disclosure relates generally to communication networks, and more particularly, to deep packet inspection.

BACKGROUND

There is a growing demand for network devices capable of examining the content of data packets in order to improve network security and provide application-specific services. Modern network devices need to perform Deep Packet Inspection (DPI) at high speed. DPI involves scanning packet content for matching with a predefined dataset of patterns. Such patterns characterize specific classes of applications, viruses, or protocol definitions.

BRIEF DESCRIPTION OF THE FIGURES

Corresponding reference characters indicate corresponding parts throughout the several views of the drawings.

DESCRIPTION OF EXAMPLE EMBODIMENTS

Overview

Figure 1:
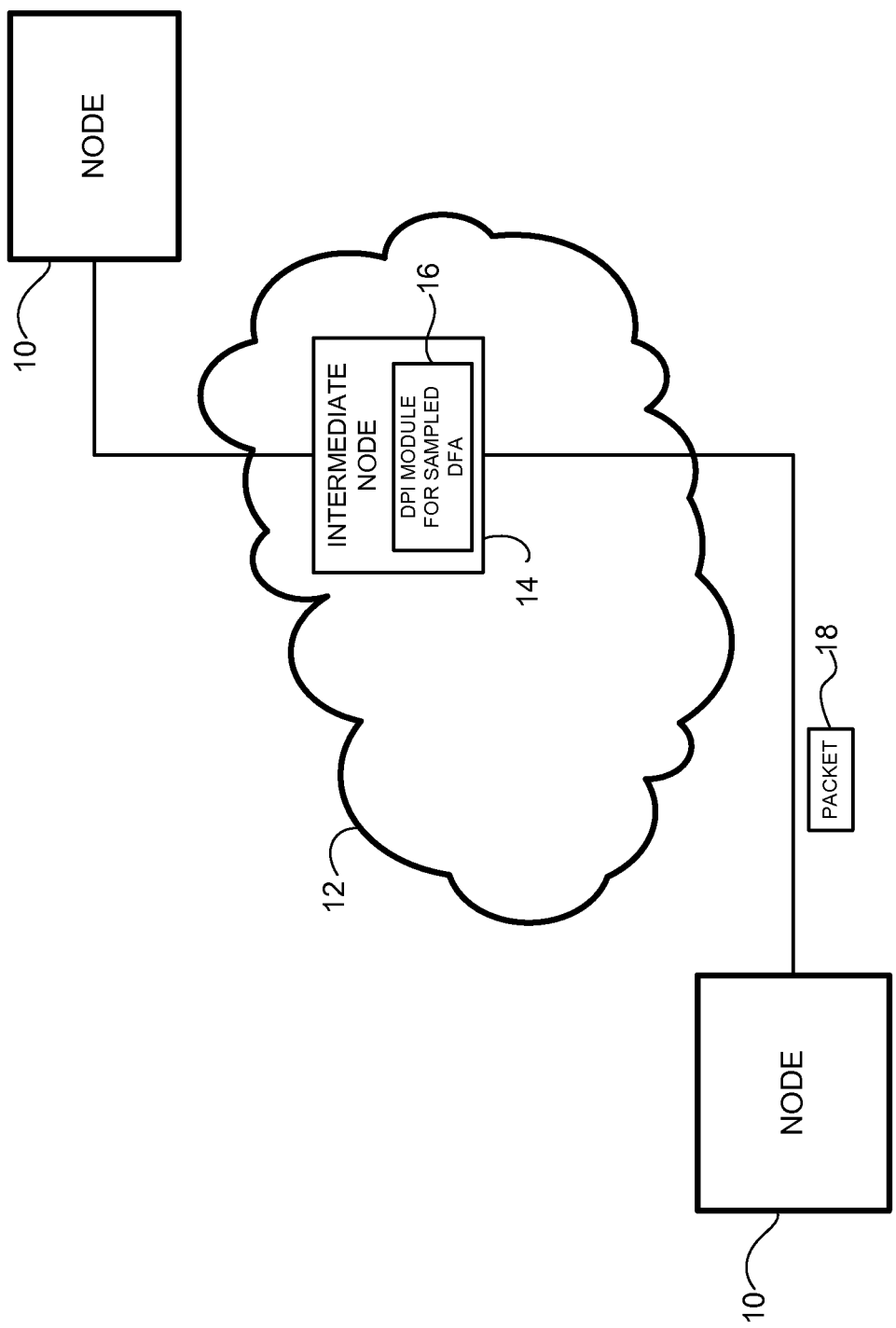
FIG. 1 illustrates an example of a network in which embodiments described herein may be implemented.

In one embodiment, a method generally comprises sampling text in a received packet at a network device and analyzing the sampled text using a sampled deterministic finite automata (DFA) to identify matches between a set of regular expressions and the text. The sampled DFA is created with the regular expressions sampled at a sampling rate calculated for the regular expressions using operations comprising selecting a minimum sampling rate from sampling rates computed for each of the regular expressions based on a minimum length of the text that can match the regular expression.

In another embodiment, an apparatus generally comprises a processor for sampling text in a received packet and analyzing the sampled text using a sampled deterministic finite automata (DFA) to identify matches between a set of regular expressions and the text. The sampled DFA is created with the regular expressions sampled at a sampling rate calculated for the regular expressions using operations comprising selecting a minimum sampling rate from sampling rates computed for each of the regular expressions based on a minimum length of the text that can match the regular expression. The apparatus further comprises memory for storing the regular expressions and the sampling rate.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Many services in communication networks are based on payload inspection, in addition to header processing. Intrusion detection as well as traffic monitoring and layer-7 filtering benefit from an accurate analysis of packet content in search of matching a predefined dataset of patterns, which may characterize, for example, specific classes of applications, viruses, or protocol definitions.

A regular expression (also referred to herein as a regex) is a sequence of characters that forms a search pattern for use in pattern matching. Regular expressions are more expressive than simple patterns of strings and are therefore able to describe a wide variety of payload signatures.

Finite automata may be used to implement regular expression matching. Nondeterministic Finite Automata (NFA) are representations that use several state transitions per character, thus having a time complexity for lookup of O(m), where m is the number of states in the NFA. Deterministic Finite Automata (DFA) is a state machine that processes an input string and upon reaching a final state, generates a list of one or more matched regular expressions. DFAs typically use only one state traversal per character, but for conventional regular expression sets they typically use an excessive amount of memory. In other words, DFAs may be fast but may be too large for certain applications; whereas, NFAs may be small but may be too slow for certain applications. Thus, both of these methods have drawbacks for implementations with large sets of signatures.

Certain embodiments described herein may increase the speed of regular expression matching by increasing the sampling rate for sampled deterministic finite automata. As described in detail below, certain embodiments use a combination of sampled regex matching and a technique for string matching such as the Boyer-Moore string search algorithm. Certain embodiments may allow for an increased speed of regex matching by a large factor (e.g., more than ten times as compared to conventional DFA), thereby providing improved DPI performance.

Referring now to the drawings, and first to FIG. 1, a simplified example of a network in which embodiments described herein may be implemented is shown. The embodiments operate in the context of a data communication network including multiple network elements. For simplification, only a small number of network elements are shown. The example shown in FIG. 1 includes nodes (e.g., hosts, endpoints, user nodes, client nodes, end stations, sources, receivers) 10 in communication with a network 12. The nodes 10 may be connected to the network using wired media (e.g., IEEE 802.3/Ethernet) or wireless media (e.g., IEEE 802.11/WiFi).

Data flow paths between the nodes 10 may include any number or type of intermediate nodes 14 (e.g., routers, switches, gateways, or other network devices) and communication links, which facilitate passage of data between the nodes. Network traffic (packets 18) may traverse one or more networks 12 (e.g., local area network, virtual local area network, metropolitan area network, wide area network, enterprise network, Internet, intranet, radio access network, public switched network, or any other network).

Network device (intermediate node) 14 is located within a data path between the nodes 10. The network device 14 may be, for example, a router, switch, gateway, firewall, or any other network device. The network device 14 may be in communication with any number of nodes or networks. In the example shown in FIG. 1, the network device 14 comprises a deep packet inspection module 16 operable to perform sampled DFA for regex matching, as described in detail below. The DPI module 16 may also be located at another network device in communication with intermediate node 14, with the intermediate node 14 transmitting the packet 18 or a copy of the packet to the network device comprising the DPI module for inspection.

The DPI module 16 module may be used for intrusion detection, security screening, load balancing, traffic analysis, or any other application. For example, DPI may be used to examine the contents (e.g., data or data and header) of the packet 18 as it passes an inspection point, searching for protocol non-compliance, viruses, spam, intrusions, or other defined criteria. The information may be used in deciding whether to allow the packet to pass through the inspection point, or if it needs to be routed to a different destination or dropped. DPI may also be used to collect statistical information or analyze and classify traffic content. For example, DPI may be used to analyze traffic content and classify it to allow metadata labeling of flows where MediaNet tagging is not provided by a traffic source. It is to be understood that these are only examples and that the embodiments described herein may be used for other applications.

In one embodiment, the DPI module 16 processes the packet payload and identifies a set of predefined patterns. The patterns may, for example, characterize specific classes of applications, viruses (e.g., for IDS) or protocol definitions. Based on results of the packet inspection, a number of actions may be taken, including, for example and in any suitable combination, dropping the packet, allowing the packet to be forwarded, modifying the packet, dropping the packet and related packets, allowing the packet and related packets to be forwarded, or classifying and labeling the packet.

As described in detail below, regular expressions (regexes) may be used in pattern matching. Deterministic Finite Automata (DFA) may be employed to implement regular expression matching. A technique may be used to introduce large spacing (big jumps') in the matching process for faster DPI. In one embodiment, Boyer-Moore sampled DFA is used, which may increase the speed of regex matching.

It is to be understood that the network shown in FIG. 1 and described herein is only an example and that the embodiments may be implemented in networks having different network topologies or network devices or for use in different applications, without departing from the scope of the embodiments.

Figure 2:
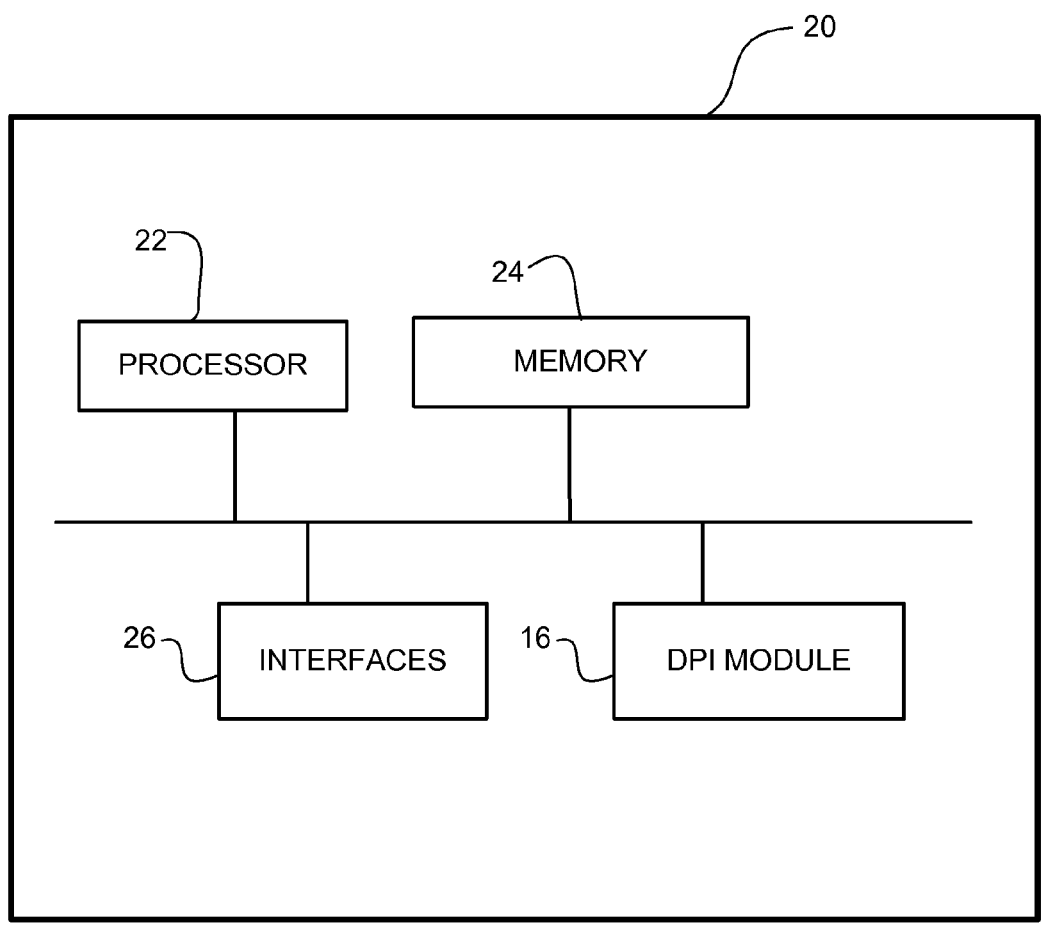
FIG. 2 depicts an example of a network device useful in implementing embodiments described herein.

FIG. 2 illustrates an example of a network device 20 that may be used to implement the embodiments described herein. In one embodiment, the network device 20 is a programmable machine that may be implemented using any suitable combination of hardware, firmware, and software. The network device 20 includes one or more processor 22, memory 24, network interfaces 26, and DPI module 16.

In certain embodiments, the DPI module 16 comprises software, applications, code, or programs stored in memory 24. The DPI module may also comprise hardware such as field-programmable gate arrays (FPGAs), for example. In other words, the DPI module 16 may be implemented using any suitable combination of hardware, firmware, and software.

Memory 24 may be a volatile memory or non-volatile storage, which stores various applications, operating systems, modules, and data for execution and use by the processor 22. Memory 24 may store regular expressions or data collected by DPI module 16, for example.

Logic may be encoded in one or more tangible media for execution by the processor 22. For example, the processor 22 may execute codes stored in a computer-readable medium such as memory 24. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. The computer-readable medium may be a non-transitory computer-readable storage medium, for example.

The network interfaces 26 may comprise any number of interfaces (linecards, ports) for receiving data or transmitting data to other devices. The network interface 26 may comprise, for example, an Ethernet interface.

It is to be understood that the network device 20 shown in FIG. 2 and described above is only an example and that different configurations of network devices may be used. For example, the network device 20 may further include any suitable combination of hardware, software, algorithms, processors, modules, devices, mechanisms, components, or elements operable to facilitate the capabilities described herein.

Figure 3:
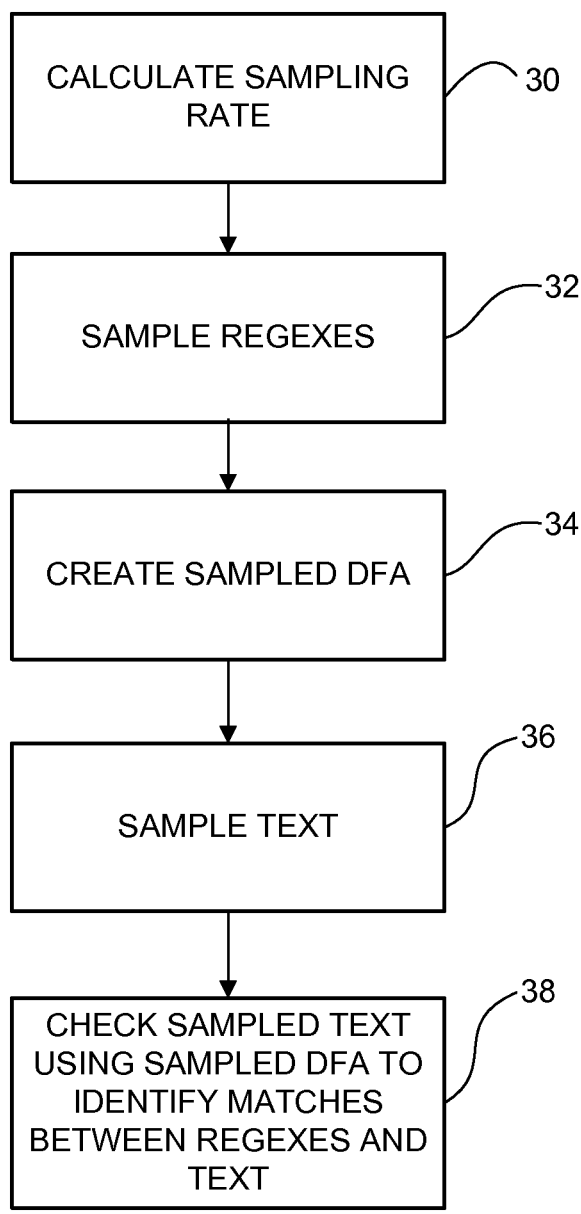
FIG. 3 is a flowchart illustrating an overview of a process for deep packet inspection using sampled deterministic finite automata, in accordance with one embodiment.

FIG. 3 is a flowchart illustrating an overview of a process for deep packet inspection, in accordance with one embodiment. A network device (e.g., router, switch 14 in FIG. 1) receives or has stored in memory a dataset comprising regular expressions for use in pattern matching. The network device 14 (DPI module 16, processor) calculates a sampling rate for the set of regular expressions (step 30). In one embodiment, calculating the sampling rate comprises selecting a minimum sampling rate from sampling rates computed for each of the regular expressions based on a minimum length of text that can match the regular expression. An example of a process for calculating the sampling rate is described below with respect to FIG. 4.

The regular expressions in the set are sampled with the sampling rate calculated at step 30 (step 32) and a sampled DFA is created with the sampled regular expressions (step 34). The calculated sampling rate is used to sample input text (e.g., payload text of received packet 18) (step 36). The sampled text is fed to the sampled DFA (step 38). As described above, DFA processes the text and may generate a list of one or more matched regular expressions. If any matches are found between the regular expressions and text, they are identified at step 38. In one embodiment, if a match is found, additional processing is performed to eliminate false positives, as described below with respect to FIGS. 5 and 6. Thus, the term 'match' as used herein may refer to a preliminary match that may have to be confirmed.

Figure 4:
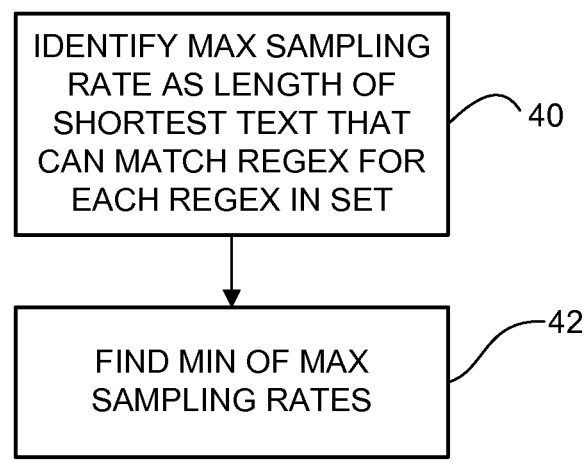
FIG. 4 is a flowchart illustrating a process for calculating a sampling rate in the process of FIG. 3, in accordance with one embodiment.

FIG. 4 illustrates an overview of a process for calculating the sampling rate, in accordance with one embodiment. For each regular expression in the dataset, the network device 14 (e.g., DPI module 16, processor) computes a maximum sampling rate as the length of the shortest text that can match it (step 40). The network device takes the minimum of these maximum sampling rates for the whole dataset and chooses it as the sampling rate (step 42).

Figure 5:
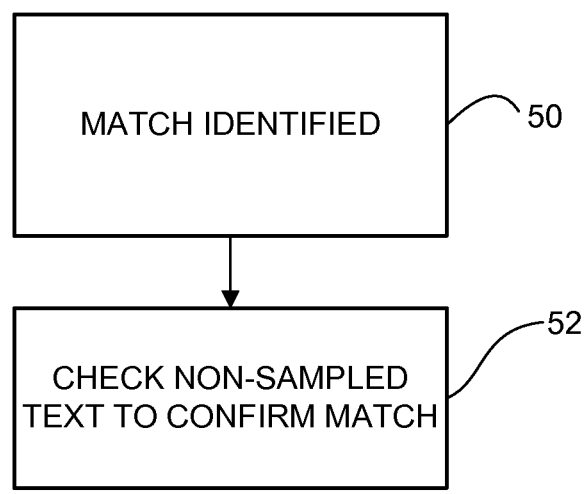
FIG. 5 is a flowchart illustrating a process for confirming a match identified in the process of FIG. 3, in accordance with one embodiment.

FIG. 5 illustrates an overview of a process for additional searching performed on a match to confirm the match, in accordance with one embodiment. For each match identified (step 50), non-sampled text is checked to confirm the match (step 52). In one embodiment, a reverse DFA is used to match all remaining characters and eliminate false positives. An example of a process for confirming the match is described below with respect to FIG. 6.

It is to be understood that the processes shown in FIGS. 3, 4, and 5 and described above are only examples and that steps may be added, combined, or modified, without departing from the scope of the embodiments.

In one embodiment a technique such as Boyer-Moore is used in combination with sampled regular expression matching to increase the sample rate for sampled DFAs for regular expression matching. An overview of Boyer-Moore is described below, followed by an overview of sampled regular expression matching. This is followed by an example of the combined techniques implemented in one embodiment.

Boyer-Moore is a sublinear algorithm for single-string matching developed by Robert S. Boyer and J. Strother Moore (see, for example, Boyer et al., "A Fast String Search Algorithm", Communications of the ACM, Volume 20, Number 10, October 1977). The Boyer-Moore algorithm searches for a string (pattern) S in text (T) by performing character comparisons at different alignments. Rather than searching all alignments, Boyer-Moore uses information gained by pre-processing the string to skip as many alignments as possible. The algorithm scans the characters of the pattern from right to left beginning with the rightmost one. In case of a mismatch (or a complete match of the whole pattern) it uses precomputed functions to shift the window to the right.

The Boyer-Moore algorithm generally works as follows for a string S of length n. In order to match string S in the first n characters of the text, the n-th character must be the last character of S. If not, then the first n characters do not match the substring. S can be starting a bit later in the text. In this case the n-th character of text can be any other character of S (e.g., (n−k)-th character of S). If the n-th character of text is the (n−k)-th character of S, then substring S may be starting from the k-th position in the text. The algorithm thus tries to go backwards in the text and checks whether this hypothesis is correct. Because of the n character jumps, the algorithm is sublinear in time and therefore can take less than m bits of time if text is m characters long.

In one embodiment, regular expression matching is sped up by sampling input text, on the assumption that matching is an uncommon event. By speeding up most of the processing by sampling the payload text, the number of characters to be checked is reduced. In one embodiment, this involves the creation of sampled DFA and further processing for those strings that reveal a match. For example, sampling text and regexes may result in a certain probability of false alarms, which potentially could result in a need for an additional search. In most cases, the first fast sampled lookup is enough to classify packets, while very few packets will need a second stage of processing.

In one embodiment, a two-step matching mechanism is used for sampled regex matching. The first step is to feed a sampled DFA with sampled text. For example, if the sampling rate is two, only one character in two (e.g., only odd ones) are given to the sampled DFA. The second step is triggered if the sampled DFA shows a match. In this case, a regular DFA is used to match all of the other characters that have been skipped in the first step.

Figure 6:
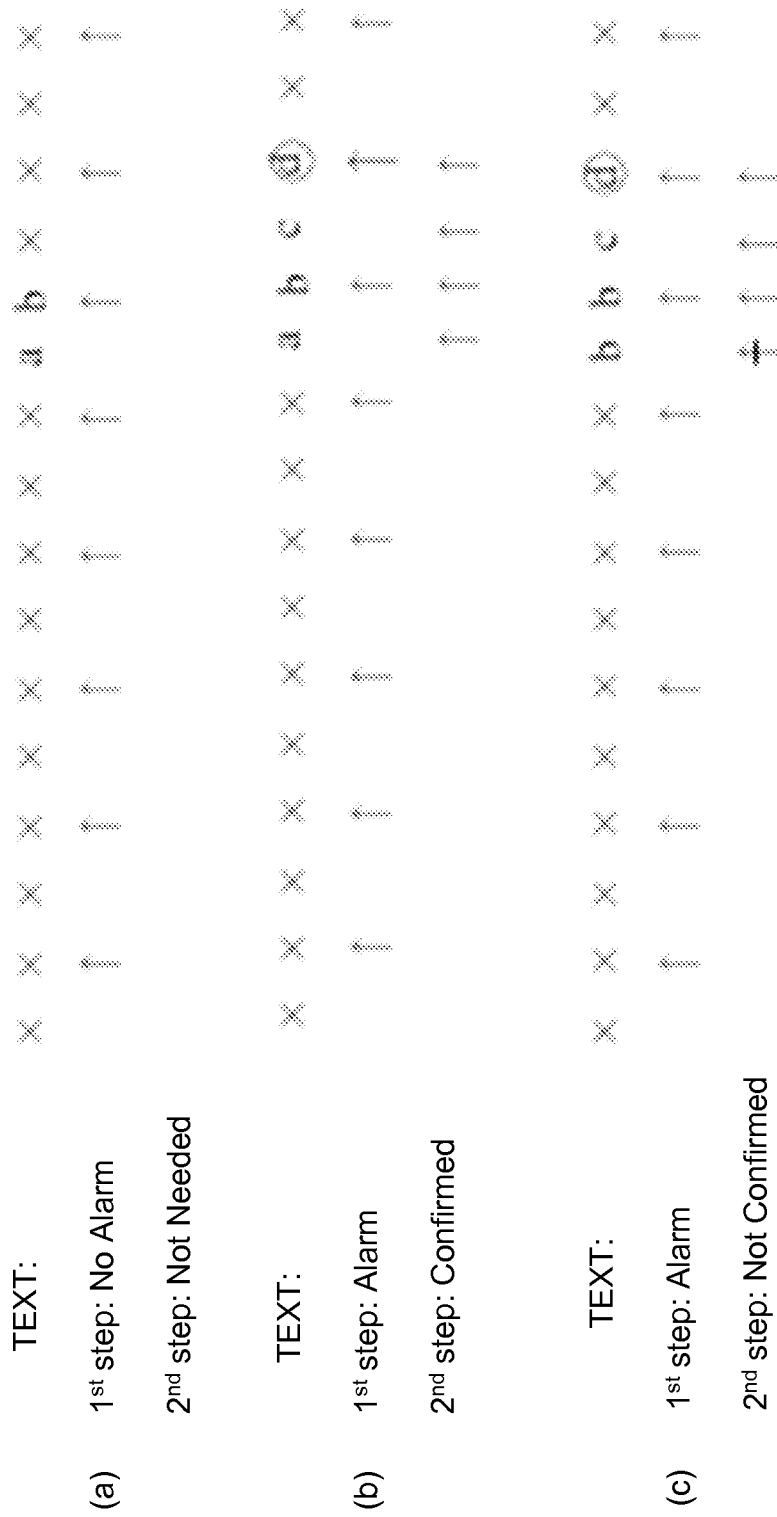
FIG. 6 illustrates an example of confirming a match found in the process of FIG. 3, in accordance with one embodiment.

FIG. 6 illustrates an example of sampled regex matching with a regex ab.*cd. A sampled DFA (that matches [ab].*[cd]) is used along with a regular non-sampled DFA. A first check on the text is performed using the sampled DFA. If a match is found, the process is moved on to the second step.

Example (a) in FIG. 6 represents a scenario with traffic that does not match signatures. Whenever the sampled regex is matched ((b) and (c) in FIG. 6, where the circled letter indicates the sample where the match is found), the non-sampled text is checked to confirm the match. To address this, DFAs are adopted that match reversed signatures (in the above example, dc.*ba). Any regular language is closed with respect to reversing operations; therefore a regular expression can be reversed and matched inside a text by observing the text backwards from the end to the beginning. If a match occurs in the second stage, because of the equivalence of reversed and forward DFAs, there is a confirmed match (b). Otherwise, a false alarm occurred (c).

The embodiments extend the sampled regular expression matching described above by using a technique such as Boyer-Moore for substring matching. This introduces big jumps in the matching process. Since a regex can be considered as composed of a number of x-strings combined by .* closures, a minimum size of the matching text can be computed for a certain regex as the sum of the length of all of its composing substrings. For example, if regex r1 is S1.*S2.*S3.*S4, then the minimum length of text that can match it is len(S1)+len(S2)+len(S3)+len(S4), where S represents a substring.

The minimum length of text that can match a regex is used as a regex sampling rate. The minimum among all regex sampling rates is chosen as the sample rate in order not to have false negatives.

By using Boyer-Moore with sampled regex matching, the sampling rate can be increased (e.g., by more than ten times) as compared with conventional DPI engines or general regex matching systems.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
   sampling text in a received packet at a network device; and
   analyzing the sampled text using a sampled deterministic finite automata (DFA) to identify matches between a set of regular expressions and the text, the sampled DFA created with said regular expressions sampled at a sampling rate, the sampling rate calculated for said regular expressions using operations comprising selecting a minimum sampling rate from sampling rates computed for each of said regular expressions based on a minimum length of the text that can match said regular expression;
   wherein the minimum length comprises a sum of lengths of substrings in said regular expression.

2. The method of claim 1 wherein sampling the text comprises sampling the text at the calculated sampling rate.

3. The method of claim 1 further comprising performing a reverse DFA process to match remaining characters if a match is found.

4. The method of claim 3 wherein the match is confirmed if the reverse DFA identifies the match, otherwise the match is a false alarm.

5. The method of claim 1 wherein calculating the sampling rate comprises utilizing a Boyer-Moore algorithm for substring matching.

6. The method of claim 1 further comprising processing the received packet based on whether a match was found.

7. An apparatus comprising:
   a processor for sampling text in a received packet and analyzing the sampled text using a sampled deterministic finite automata (DFA) to identify matches between a set of regular expressions and the text, the sampled DFA created with said regular expressions sampled at a sampling rate, the sampling rate calculated for said regular expressions using operations comprising selecting a minimum sampling rate from sampling rates computed for each of said regular expressions based on a minimum length of the text that can match said regular expression; and
   memory for storing said regular expressions and the sampling rate;
   wherein the minimum length comprises a sum of lengths of substrings in said regular expression.

8. The apparatus of claim 7 wherein the text is sampled at the calculated sampling rate.

9. The apparatus of claim 7 further wherein the processor is further operable to perform a reverse DFA process to match remaining characters if a match is found.

10. The apparatus of claim 9 wherein the match is confirmed if the reverse DFA identifies the match, otherwise the match is a false alarm.

11. The apparatus of claim 7 wherein a Boyer-Moore algorithm is used to provide a reduced sampling rate.

12. The apparatus of claim 7 wherein the processor is further operable to process the received packet based on whether a match was found.

13. Logic encoded on one or more non-transitory computer readable media for execution and when executed operable to:
   sample text in a received packet; and
   analyze the sampled text using a sampled deterministic finite automata (DFA) to identify matches between a set of regular expressions and the text, the sampled DFA created with said regular expressions sampled at a sampling rate, the sampling rate calculated for said regular expressions using operations comprising selecting a minimum sampling rate from sampling rates computed for each of said regular expressions based on a minimum length of the text that can match said regular expression;
   wherein the minimum length comprises a sum of lengths of substrings in said regular expression.

14. The logic of claim 13 wherein the text is sampled at the calculated sampling rate.

15. The logic of claim 13 wherein the logic is further operable to perform a reverse DFA process to match remaining characters if a match is found.

16. The logic of claim 13 wherein a Boyer-Moore algorithm for substring matching is utilized.

17. The logic of claim 13 wherein the received packet is classified based on the match identified.

18. The logic of claim 15 wherein the match is confirmed if the reverse DFA identifies the match, otherwise the match is a false alarm.

* * * * *